Figure 1:
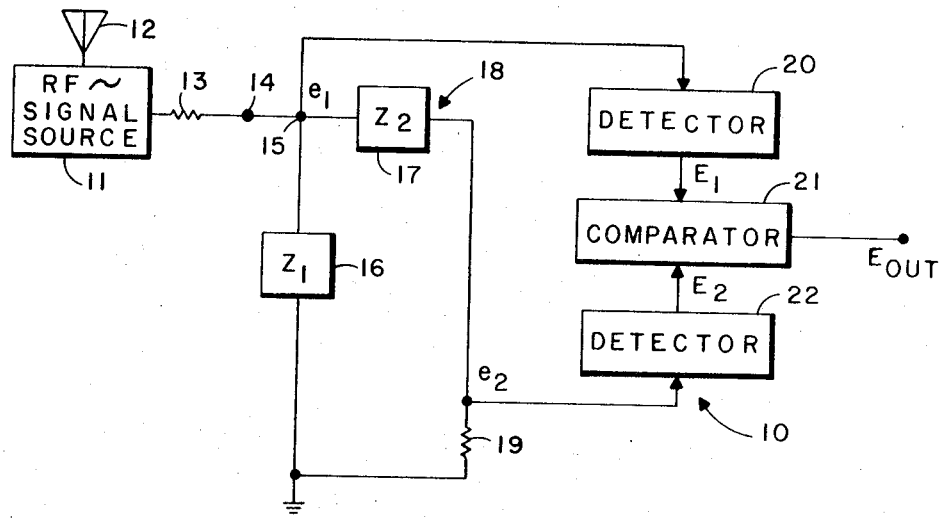

United States Patent
Sellers et al.

[15] 3,659,116
[45] Apr. 25, 1972

[54] POWER INSENSITIVE FREQUENCY DETECTOR

[72] Inventors: Glenn W. Sellers, Cedar Rapids; Richard W. Carroll, Marion, both of Iowa

[73] Assignee: Collins Radio Company, Dallas, Tex.

[22] Filed: Sept. 14, 1970

[21] Appl. No.: 71,780

[52] U.S. Cl. ........................307/233, 307/295, 325/458, 325/462, 328/138, 328/140, 328/167, 340/171
[51] Int. Cl. ..........................................................H03h 7/10
[58] Field of Search ..................307/233, 271, 295; 328/138, 328/140, 167, 165; 325/458, 462; 340/171 A, 171

[56] References Cited

UNITED STATES PATENTS

| | | | |
|---|---|---|---|
| 2,231,996 | 2/1941 | Guanella et al. | 327/141 |
| 2,935,572 | 5/1960 | Hastings et al. | 340/171 X |
| 3,038,123 | 6/1962 | Crimmins | 328/138 |
| 3,281,701 | 10/1966 | Axe | 307/233 X |
| 3,308,389 | 3/1967 | Toman et al. | 307/233 X |
| 3,522,448 | 8/1970 | Hallock et al. | 307/233 |
| 3,532,908 | 10/1970 | Jennings | 307/233 X |

*Primary Examiner*—Stanley T. Krawczewicz
*Attorney*—Warren H. Kintzinger and Robert J. Crawford

[57] ABSTRACT

A frequency detector for determining whether or not the fundamental frequency of an existing periodic signal lies within, or outside of, a preselected band and with the determination substantially independent of the absolute signal power level. A two-pole filter, used in the circuit, is designed for the magnitude of the voltage $e_2$, of a second pole element, to exceed the voltage $e_1$, of a first pole element, whenever signal frequency is significantly present within the prescribed band, and with $e_2$ less than $e_1$ outside the prescribed band independently of the absolute levels of $e_1$ and $e_2$. This detection and comparison of the ac signals $e_1$ and $e_2$ provides the desired frequency band discrimination operational results.

10 Claims, 14 Drawing Figures

INVENTORS.
GLENN W. SELLERS
RICHARD W. CARROLL

BY *Warren H. Kintzinger*
ATTORNEY

INVENTORS.
GLENN W. SELLERS
RICHARD W. CARROLL

BY *Warren H. Kirkpatrick*
ATTORNEY

POWER INSENSITIVE FREQUENCY DETECTOR

This invention relates in general to signal frequency band monitoring, and in particular, to detecting signal presence, or absence, within a specific predetermined frequency band.

The need for a self-test capability manifests itself quite often with up-to-date communications systems and, for example, with the RF signal transmitting radio gear employed with present day navigational systems. As is often the case, several system parameters must be subjected to test simultaneously; and in such cases it is highly desirable that the parameters subject to test be testable independently of each other. One case in point is when it is desired to test both the frequency and the power output of an RF signal energy source. One obvious way to test source frequency is to pass a sample of the RF signal power through a precision bandpass filter having a bandwidth equal to the allowed frequency range and if a filter output exists, it is concluded that the frequency meets specifications. However, if not, it is concluded that the frequency is out of the specification range imposed. Now, however, if the frequency test is to be made independent of power level, the response skirts of the filter must be extremely steep, an operational requirement generally requiring a very complex filter.

It is, therefore, a principal object of this invention to provide an improved circuit providing stringent frequency selectivity operational results as a frequency detector far less complex and more efficient than frequency detectors generally heretofore employed.

Another object is to provide such an improved frequency detector adapted to bandpass frequency detection.

A further object is to provide frequency detectors employing such circuit improvements as particularly applicable respectively to low-pass, high-pass, and band reject filter circuit frequency detector usage.

Features of the invention useful in accomplishing the above objects include, in the respective frequency detector circuits, a two-pole filter, a pair of detectors, and a comparator. This is with, for the two-pole filter used in the circuit, a magnitude of voltage $e_2$ of a second pole element to exceed the voltage $e_1$ of a first pole element of the two-pole filter whenever signal frequency is significantly present within the prescribed band(s) and with $e_2$ less than $e_1$ outside the prescribed band(s) independently of the absolute levels of $e_1$ and $e_2$. These filter pole resonant voltages are detected and compared for providing the desired frequency band discrimination operational results with the determination substantially independent of the absolute signal power level involved.

Specific embodiments representing what are presently regarded as the best modes of carrying out the invention are illustrated in the accompanying drawings.

Figure 2A:
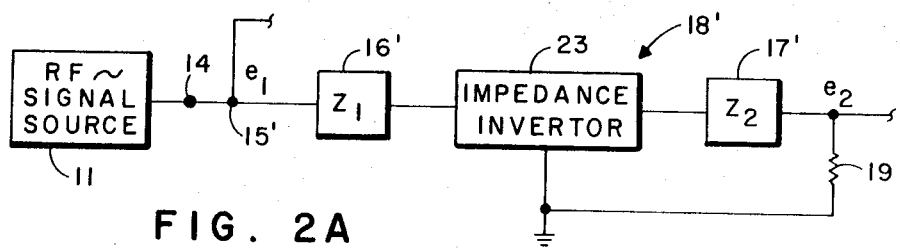
Figure 2B:
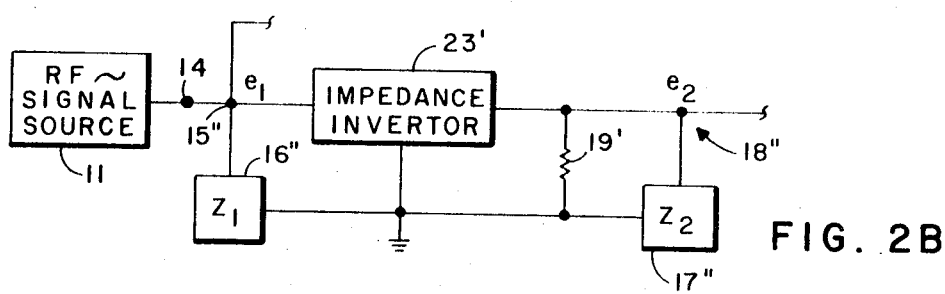
Figure 2C:
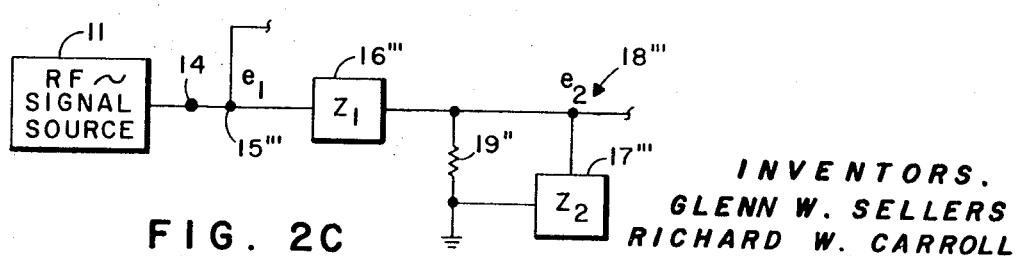
Figure 3A:
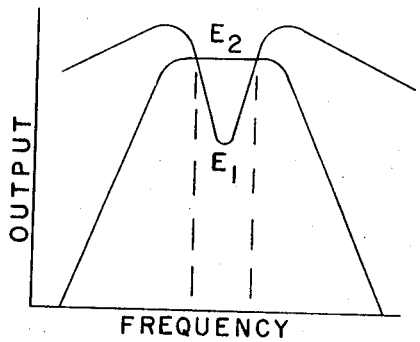
Figure 7:
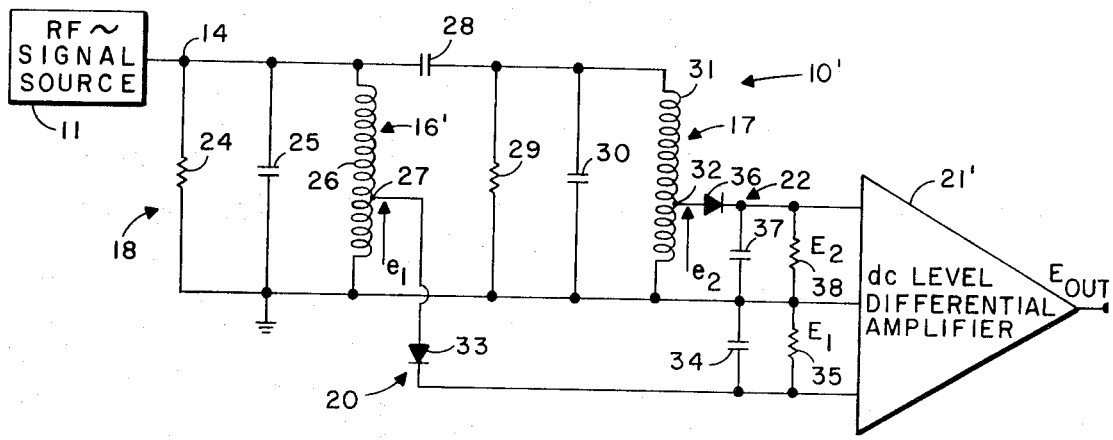
Figure 8:
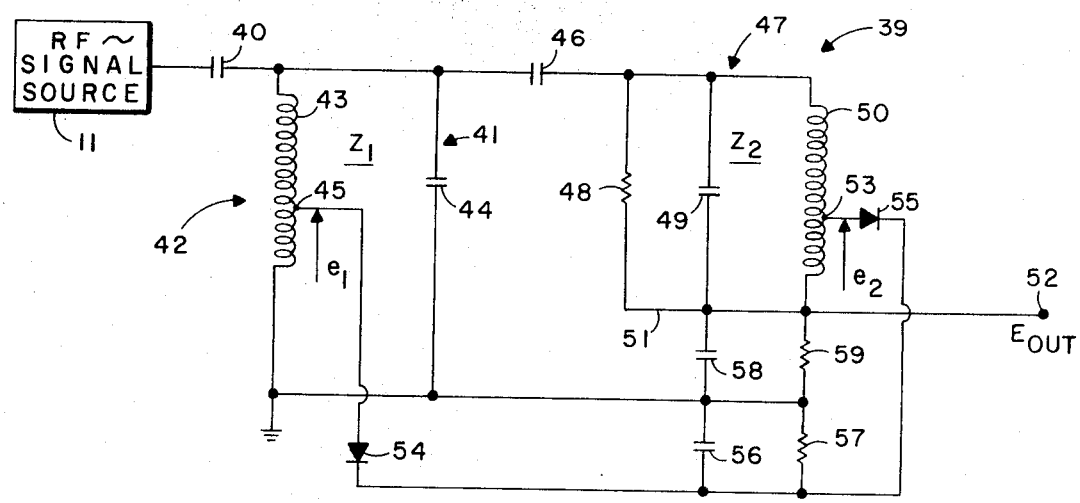

In the drawings:

FIG. 1 represents a block schematic of a power insensitive frequency detector in accord with applicants' teachings with the two-pole filter thereof indicated in block diagram form;

FIGS. 2A, 2B, and 2C, partial block diagrams showing, generally, in block form other two-pole filters, respectively, that may be used with applicants' power insensitive frequency detector circuits;

FIGS. 3A and B, 4A and B, 5A and B, and 6A and B represent typical responses for four common filter types that are obtainable with the proper selection of values and design with any of the two-pole filter embodiments of FIGS. 1 and 2A through 2C;

FIG. 7, a more detailed schematic diagram of the power insensitive frequency detector shown in block diagram form in FIG. 1 with a comparator separate from the detectors; and FIG. 8, a schematic showing of a power insensitive frequency detector with the comparator and detectors sections in combined form.

Referring to the drawings, with the power insensitive frequency detector 10, of FIG. 1, an RF signal source 11 is shown that may be subject to excitation by an antenna 12 to produce a periodic signal such as an RF sinusoidal waveform IF signal output. RF signal source 11 may actually include an internal signal generating source such as in a transmitter. It could also be a below RF signal source such as a 400 cycle signal of an ac power supply even though labeled as an RF signal source in the embodiments shown. In any event, the signal output being checked may be fed through a resistor 13 that generally would be included with signal source 11 as internal resistance thereof, to terminal 14 and the input common junction 15 of the $Z_1$ pole section 16 and $Z_2$ pole section 17 two-pole tuned circuit filter 18. The other side of the $Z_1$ pole section 16 of the filter 18 from common junction 15 is connected to ground and the other side of $Z_2$ pole section 17 of the filter 18 from junction 15 is connected through resistor 19 to ground. Furthermore, the common junction 15 of the $Z_1$ and $Z_2$ pole sections 16 and 17 of the filter 18 is connected as a signal input to detector 20 as an $e_1$ input thereto for developing a detected dc $E_1$ output applied to a comparator circuit 21. The common junction of the $Z_2$ pole section 17 of filter 18 and resistor 19 as an $e_2$ ac signal source is applied as an input to a detector 22 for developing a dc $E_2$ output also applied as an input to comparator circuit 21 for developing a dc $E_{out}$ voltage with the comparator 21 constructed for providing such a dc $E_{out}$ voltage whenever the $E_2$ input thereto is greater than the $E_1$ input thereto. Thus, a power insensitive frequency detector circuit is provided that indicates whether or not the frequency spectrum of its input signal lies within a prescribed range (or prescribed ranges in some cases) with this function performed independently of the absolute value of the power input. If the input signal spectrum falls within the prescribed range, an appropriate output will be provided over an extremely wide range of input power; if on the other hand the signal spectrum is outside the prescribed range, there will be no output developed regardless of how high the input power may be.

With reference again to FIG. 1, the actual composition of the $Z_1$ and $Z_2$ polar sections 16 and 17 of the two-pole filter 18 depends upon the type of filter required for the specific bandpass objectives desired whether it be a low-pass, high-pass, bandpass, or band reject type filter function. In any event, the detectors 20 and 22 employed convert the ac signals $e_1$ and $e_2$ into dc signals $E_1$ and $E_2$ that are proportional to the ac signals $e_1$ and $e_2$, respectively. The comparator 21 then compares the amplitude of the dc signals $E_1$ and $E_2$ and provides an output when $E_2$ is greater than $E_1$ and no output when $E_1$ is greater than $E_2$. This is with the output resulting when $E_2$ is greater than $E_1$ possibly being proportional or not being proportional to $E_2$ depending upon the actual system of comparison employed. If the amplitude of the input RF signal increases or decreases, $e_1$ and $e_2$ increase or decrease proportionately and the relative amplitudes remain the same. It is interesting to note that the overall response of the $E_2$ signal versus frequency is flat over the accept band(s) although this should not be thought of as a limitation since this $E_2$ response need not be flat over the accept band for appropriate comparator output response. Further, the response to the ac signal $e_1$ converted to dc $E_1$ versus frequency has a saddle in the accept band and in a sense relative to the $E_2$ voltage a peak in the reject band, or bands.

FIGS. 2A, 2B and 2C show in block diagram form alternate two-pole filters 18', 18'' and 18''', respectively with, in the showing of FIG. 2A, RF signal source 11 supplying an input via junction 15' to $Z_1$ filter pole section 16' having a connection to impedance inverter 23 that also has a connection on its other side to $Z_2$ pole section 17'. The other side of $Z_2$ pole section 17' is the $e_2$ connection comparable to the same $e_2$ connection of the embodiment of FIG. 1, and with the junction 15' being the $e_1$ connection for the circuit of FIG. 2A. In the two-pole filter embodiment of FIG. 2B, the RF signal from signal source 11 is passed to the $e_1$ signal junction 15'' that is common to the $Z_1$ pole section 16'' and also to the impedance inverter 23'. The other side of the impedance inverter circuit 23' is the $e_2$ connection line of the filter that is connected through resistor 19' to ground and also through the $Z_2$ pole section 17'' to ground.

With the two-pole filter of FIG. 2C, the RF signal from signal source 11 is passed via the $e_1$ signal junction 15''' of the $Z_1$ pole section 16''' of two-pole filter 18''' with the other side thereof connected through resistor 19'' to ground and with this $e_2$ generating location of the $Z_2$ polar section 17''' also connected through $Z_2$ polar section 17''' circuitry to ground.

Figure 4A:
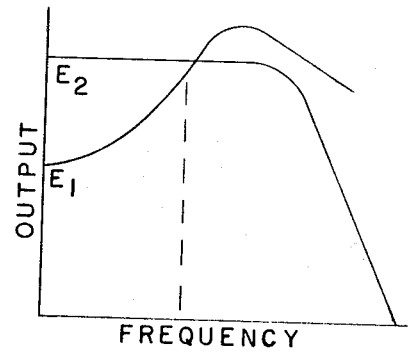
Figure 3B:
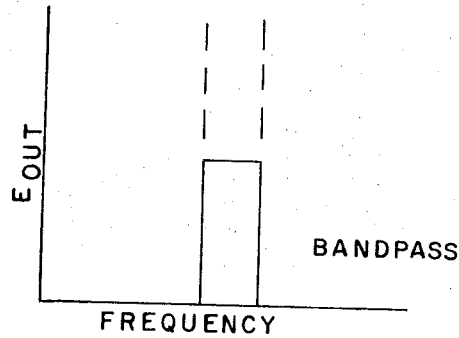
Figure 4B:
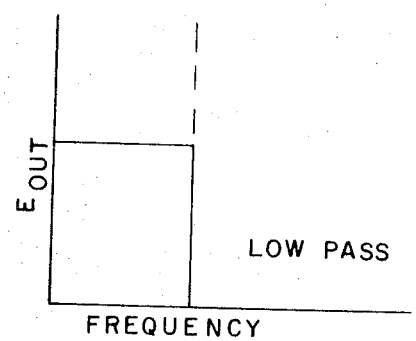
Figure 5A:
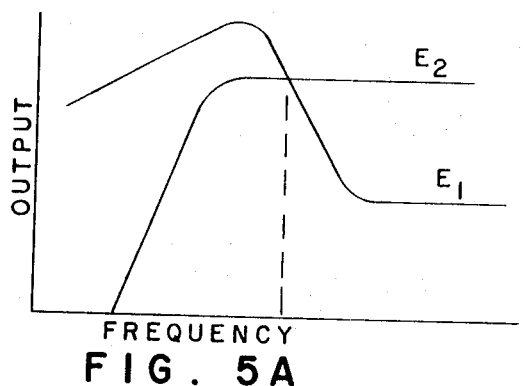
Figure 6A:
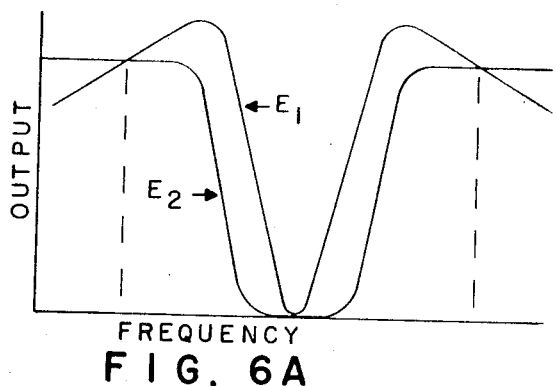
Figure 5B:
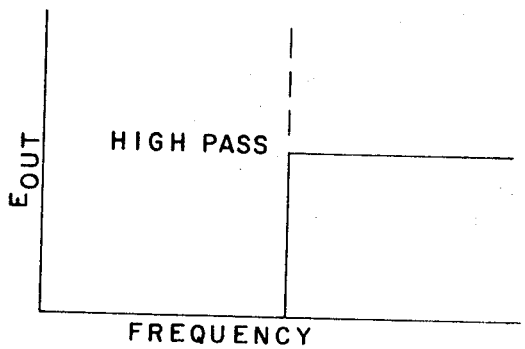
Figure 6B:
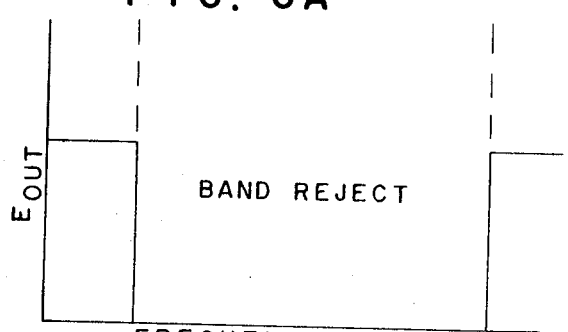

With the various two-pole filters 18 through 18''' shown, the actual composition of the $Z_1$ and $Z_2$ pole sections of the respective filters depends upon the type of filter required whether it be a low-pass, high-pass, bandpass or band reject filter, and the particular filter configuration such as those shown used to realize the desired filter result. With the $Z_1$ and $Z_2$ poles configured for the bandpass operational results, the dc $E_1$ and $E_2$ waveforms may be as shown in FIG. 3A with the dc $E_{out}$ to frequency bandpass output being as illustrated in FIG. 3B. For the low-pass mode of operation, the $Z_1$ and $Z_2$ pole sections of the filters would in their filter environment be configured to provide dc $E_1$ and $E_2$ curves as set forth in FIG. 4A to give a dc $E_{out}$ to frequency low-pass result as shown in FIG. 4B. This rationale applies with respect to the $E_1$ and $E_2$ dc curves of FIG. 5A resulting in a high-pass $E_{out}$ to frequency operational results of FIG. 5B, and then the overlapping dc $E_1$ to $E_2$ curves of FIG. 6A give the dc $E_{out}$ to frequency band reject operational result illustrated in FIG. 6B.

With the more detailed embodiment of FIG. 7 showing in greater detail a power insensitive frequency detector, such as shown in block diagram form in FIG. 1, the signal source 11 is connected to the power insensitive frequency detector 10' via terminal 14. In this particular implementation of a power insensitive frequency detector, the $Z_1$ pole section 16 of the two-pole filter 18 includes a resistor 24, capacitor 25, and coil 26 connected in parallel between the terminal 14 and ground with the ac $e_1$ junction point being at a tap 27 of the coil 26. The input periodic signal from the signal source 11 is also capacitively coupled through signal coupling capacitor 28 to the $Z_2$ pole section 17 of the two-pole filter 18 with this $Z_2$ pole section 17 including resistor 29, capacitor 30 and coil 31 connected in parallel between the signal coupling capacitor 28 and ground with the ac $e_2$ junction point being at a tap 32 of coil 31. With this structure the detector 20 includes a diode 33 with the anode connected to tap 27 of coil 26 and a capacitor 34 connected in parallel with resistor 35 between the cathode of diode 33 and ground, and with the cathode of diode 33 also connected as a dc $E_1$ output connection input to dc level differential amplifier 21' as the comparator of this particular power insensitive frequency detector embodiment 10'. With detector 22 diode 36 has an anode connection to tap 32 of coil 31 and the cathode thereof is connected through capacitor 37 and resistor 38 in parallel to ground and the cathode of diode 36 is also connected as the dc $E_2$ developed by the detector across resistor 38 input to the dc level differential amplifier circuit 21' for developing a dc $E_{out}$ whenever the dc $E_2$ input is of greater magnitude than the dc $E_1$ input to the dc level differential amplifier 21'.

Referring now to the power insensitive frequency detector 39 embodiment of FIG. 8 that utilizes a combined detector and comparator circuit as opposed to the embodiments of FIG. 7 and FIG. 1 with a comparator 21 or 21' separate from the detectors, the signal from signal source 11 is passed through signal coupling capacitor 40 to the $Z_1$ pole section 41 of the two-pole filter 42. The $Z_1$ pole side of signal coupling capacitor 41 is connected through coil 43 and capacitor 44 in parallel with the ac $e_1$ junction point being at a tap 45 of the coil 43. The periodic signal passed through signal coupling capacitor 40 as acted upon by the $Z_1$ pole section 41 of the filter 42 is fed through signal coupling capacitor 46 to the $Z_2$ pole section 47 of the two-pole filter 42. This is with the $Z_2$ pole section 47 including resistor 48, capacitor 49 and coil 50 all connected in parallel between signal coupling capacitor 46 and the dc $E_{out}$ line 51 terminated with dc $E_{out}$ terminal 52, and with the ac $e_2$ junction point being at tap 53 of coil 50. Tap 45 of coil 43 of the $Z_1$ filter pole section 41 is connected to the anode of detector diode 54, the cathode of which is connected in common with the cathode of detector diode 55 having an anode connection to tap 53 of the coil 50 in the $Z_2$ filter pole section 47. The common junction of the cathodes of diodes 54 and 55 is connected through capacitor 56 and resistor 57 in parallel to ground and the dc $E_{out}$ line 51 is connected through capacitor 58 and resistor 59 in parallel to ground. The filter shown in this embodiment is a top-C coupled bandpass filter that is only one of several configurations that could be used. The connections of the $Z_1$ and $Z_2$ pole sections of the two-pole section filter are such with this embodiment that as long as $e_1$ is greater than $e_2$ diode 54 rectifies and back biases diode 55 with as a result the resulting dc output $E_{out}$ equalling zero. Then when $e_2$ is greater than $e_1$, the diode 55 rectifies and diode 54 is back biased giving a resultant dc $E_{out}$ proportional to the ac $e_2$ signal. With this power insensitive frequency detector 39, resistor 57, resistor 59, capacitor 56 and capacitor 58 in combination provide dc loading and RF bypassing for the combined detector comparator circuit in the frequency detector 39.

A pulse insensitive frequency detector 39 built in accord with the embodiment of FIG. 8 uses components and values including the following:

| | |
|---|---|
| Signal Source 11 | 50 ohms internal resistance |
| Coupling Capacitor 40 | 14.0 pf |
| Coils 43 and 50 | 0.56 $\mu$h with 8 turns above and 4 turns below the coil taps 45 and 53, respectively |
| Capacitor 44 | 36 pf |
| Capacitor 46 | 1.4 pf |
| Resistor 48 | 26.1 K ohms |
| Capacitor 49 | 47.0 pf |
| Diodes 54 and 55 | FD 100 |
| Capacitors 56 and 58 | 1,000 pf |
| Resistor 57 | 33 K ohms |
| Resistor 59 | 15 K ohms |

A power insensitive frequency detector 39 using the preceding component values uses an exceptionally reliable relatively simple combination detection and comparison circuit to provide a 30 MHz two-pole filter frequency detector. With this embodiment, the detector diodes are connected back to back so that the detection and comparison functions are accomplished by the two diodes and their companion circuitry and the circuit is arranged such that the total dc load for diode 55 is proportioned so that the dc $E_2$ component represents approximately 2/2.84 of the secondary ac voltage $e_2$. This gives a desired 2:1 ratio of detected secondary to primary voltage at resonance frequency. Now, as long as $e_2$ is greater than $e_1$ peak, diode 54 is back-biased with diode 55 conducting and $E_{out}$ is proportional to $e_2$. However, when $e_1$ peak is greater than $E_2$ diode 54 conducts to back-bias diode 55 with the resulting $E_{out}$ equal to zero. The design calls for a bandwidth at the 3 dB point equal to 1,039 KHz with a frequency accept band for the detector-comparator of the frequency detector circuit of 1,039 2 equal to 519 KHz. If the diode I–V characteristics had an infinite second derivative at their conduction threshold, the skirt would have an infinite slope; the fact that the slope is finite, however, is a result of the somewhat gradual turn-on and turn-off characteristics of the diodes. For this reason, the design set forth with values for the embodiment of FIG. 8 was such that the cross-over of primary and secondary voltages occurs in the region of maximum primary voltage slope with the diodes beginning to switch actually at the design bandwidth of 519 KHz. Please note, however, that it takes an additional approximately 300 KHz in bandwidth before complete turn-off has been accomplished. It is particularly noteworthy that even with this extremely simple detection-comparison structure, the resulting selectivity characteristic is equivalent to a five- or six-pole filter up to the 20 dB point. Should it be necessary to obtain a sharper characteristic than this, a separate load could be provided for each diode and the two signals then compared in a simple differential amplifier having appropriate output limiting so as to accept only the proper polarity with the slope being increased by roughly the amount of gain used.

Please note further that a microwave version of the frequency detector has been built for operation in the 1,090 MHz frequency band with excellent operational results obtained therewith.

Whereas this invention is herein illustrated and described with respect to several specific embodiments thereof, it should be realized that various changes may be made without departing from the essential contributions to the art made by the teachings hereof.

We claim:

1. In a frequency detector for determining whether or not the fundamental frequency of a periodic signal lies within, or outside of, a preselected frequency band substantially independent of the absolute signal power level: a two-pole filter with a first pole frequency resonant section with input circuit means for receiving an input ac signal, and a second pole frequency resonant section with signal coupling means connected to said input circuit means; said first and second pole frequency resonant sections having ac resonant characteristic overlapping frequency responses appearing at first pole and second section output connections; and with the two-pole filter designed for the magnitude of ac voltage of said second pole section to exceed ac voltage of the said first pole section whenever signal frequency is significantly present within the prescribed band, and with the ac voltage of said second pole section less than the ac voltage of said first pole section outside the prescribed frequency band.

2. The frequency detector of claim 1, also including first ac to dc rectifier circuit means, and second ac to dc rectifier circuit means connected, respectively, to said first pole and second pole section outputs for rectifying dc voltage signals from the ac signals of said first and second pole sections, respectively; and comparator circuit means connected to receive dc inputs from said first and second ac to dc rectifier circuit means, and providing a dc output when a selected one of said dc signals from one of said ac to dc rectifier circuit means exceeds the other.

3. The frequency detector of claim 2, wherein said first and second pole sections of said two-pole filter develop ac signal outputs with resulting rectified dc signals having frequency detector bandpass sharp skirted bandpass characteristic results.

4. The frequency detector of claim 2 wherein said first and second pole sections develop ac signal response outputs such that the rectified dc voltages from the ac signals of said first and second pole sections have characteristic shapes giving frequency detector low-pass sharp skirted low-pass characteristic operational results.

5. The frequency detector of claim 2 wherein said first and second pole sections are frequency responsive to provide rectified dc voltages from the ac signals of said first and second pole sections having such characteristic shapes as to give frequency detector high-pass sharp skirted high-pass characteristic operational results.

6. The frequency detector of claim 2, wherein said first and second pole sections are frequency responsive to provide rectified dc voltages from the ac signals of said first and second pole sections having such characteristic shapes as to give frequency detector band reject sharp skirted band reject characteristic operational results.

7. The frequency detector of claim 2, wherein said first and second ac to dc rectifier circuit means each include an ac rectifying diode connected in independent rectifying circuits with signal detected voltage storing means, and impedance means connected in parallel to a voltage potential reference source also connected to respective individual opposite input connections of said comparator means.

8. The frequency detector of claim 7, wherein said dc signal comparator means is a dc differential amplifier.

9. The frequency detector of claim 2, wherein said first and second ac to dc rectifier circuit means include back-to-back connected diodes, and with the common connection between said back-to-back connected diodes of said first and second ac to dc rectifier circuit means including voltage signal storage means and impedance means connected in parallel to ground.

10. The frequency detector of claim 9, wherein said comparator is a circuit connected in common with and as a part of said first and second ac to dc rectifier circuit means, and including second dc signal voltage storage means and second impedance means connected in parallel between a signal output connection also connected to one of said pole frequency resonant sections of said two-pole filter.

* * * * *